United States Patent
Hickey et al.

(10) Patent No.: US 7,873,816 B2
(45) Date of Patent: Jan. 18, 2011

(54) PRE-LOADING CONTEXT STATES BY INACTIVE HARDWARE THREAD IN ADVANCE OF CONTEXT SWITCH

(75) Inventors: Mark J Hickey, Rochester, MN (US); Stephen J Schwinn, Woodbury, MN (US); Matthew R Tubbs, Rochester, MN (US); Charles D Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 12/274,420

(22) Filed: Nov. 20, 2008

(65) Prior Publication Data

US 2010/0125722 A1    May 20, 2010

(51) Int. Cl.
G06F 9/46 (2006.01)
(52) U.S. Cl. .................. 712/228; 718/108
(58) Field of Classification Search ............ None
See application file for complete search history.

(56) References Cited

U.S. PATENT DOCUMENTS

| | | | |
|---|---|---|---|
| 4,860,192 A | 8/1989 | Sachs et al. | |
| 5,872,985 A | 2/1999 | Kimura | |
| 5,893,159 A | 4/1999 | Schneider | |
| 5,907,702 A | 5/1999 | Flynn et al. | |
| 5,958,045 A | 9/1999 | Pickett | |
| 6,014,728 A | 1/2000 | Baror | |
| 6,073,215 A | 6/2000 | Snyder | |
| 6,128,728 A * | 10/2000 | Dowling | 712/228 |
| 6,202,130 B1 | 3/2001 | Scales, III et al. | |
| 6,223,208 B1 * | 4/2001 | Kiefer et al. | 718/108 |
| 6,253,306 B1 | 6/2001 | Ben-Meir et al. | |
| 6,292,888 B1 * | 9/2001 | Nemirovsky et al. | 712/225 |
| 6,311,260 B1 | 10/2001 | Stone et al. | |
| 6,535,962 B1 | 3/2003 | Mayfield et al. | |
| 6,574,712 B1 | 6/2003 | Kahle et al. | |
| 6,697,935 B1 | 2/2004 | Borkenhagen et al. | |
| 6,845,501 B2 | 1/2005 | Thompson et al. | |
| 6,976,147 B1 | 12/2005 | Isaac et al. | |
| 7,260,704 B2 | 8/2007 | Cooksey et al. | |
| 2003/0023663 A1 | 1/2003 | Thompson et al. | |
| 2004/0163083 A1 | 8/2004 | Wang et al. | |
| 2005/0149697 A1 | 7/2005 | Enright et al. | |
| 2006/0294347 A1 | 12/2006 | Zou et al. | |
| 2008/0104610 A1 * | 5/2008 | Norton et al. | 718/108 |

FOREIGN PATENT DOCUMENTS

| | | |
|---|---|---|
| CN | 1276888 A | 12/2000 |
| CN | 1300006 A | 6/2001 |

OTHER PUBLICATIONS

U.S. Appl. No. 09/458,883, filed Dec. 10, 1999, by Puzak et al.

* cited by examiner

*Primary Examiner*—Kenneth S Kim
(74) *Attorney, Agent, or Firm*—Wood, Herron & Evans, LLP

(57) ABSTRACT

A circuit arrangement and method utilize thread pair context caching, where a pair of hardware threads in a multithreaded processor, which are each capable of executing a process, are effectively paired together, at least temporarily, to perform context switching operations such as context save and/or load operations in advance of context switches performed in one or more of such paired hardware threads. By doing so, the overall latency of a context switch, where both the context for a process being switched from must be saved, and the context for the process being switched to must be loaded, may be reduced.

21 Claims, 8 Drawing Sheets

PRE-LOADING CONTEXT STATES BY INACTIVE HARDWARE THREAD IN ADVANCE OF CONTEXT SWITCH

FIELD OF THE INVENTION

The invention is generally related to data processing, and in particular to processor architectures and context switching therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

One area where parallelism continues to be exploited is in the area of execution units, e.g., fixed point or floating point execution units. Many floating point execution units, for example, are deeply pipelined. However, while pipelining can improve performance, pipelining is most efficient when the instructions processed by a pipeline are not dependent on one another, e.g., where a later instruction does not use the result of an earlier instruction. Whenever an instruction operates on the result of another instruction, typically the later instruction cannot enter the pipeline until the earlier instruction has exited the pipeline and calculated its result. The later instruction is said to be dependent on the earlier instruction, and phenomenon of stalling the later instruction waiting for the result of an earlier instruction is said to introduce "bubbles," or cycles where no productive operations are being performed, into the pipeline.

One technique that may be used to extract higher utilization from a pipelined execution unit and remove unused bubbles is to introduce multi-threading. In this way, other threads are able to issue instructions into the unused slots in the pipeline, which drives the utilization and hence the aggregate throughput up. Another popular technique for increasing performance is to use a single instruction multiple data (SIMD) architecture, which is also referred to as 'vectorizing' the data. In this manner, operations are performed on multiple data elements at the same time, and in response to the same SIMD instruction. A SIMD or vector execution unit typically includes multiple processing lanes that handle different datapoints in a vector and perform similar operations on all of the datapoints at the same time. For example, for an architecture that relies on quad(4)word vectors, an SIMD or vector execution unit may include four processing lanes that perform the identical operations on the four words in each vector.

The aforementioned techniques may also be combined, resulting in a multi-threaded vector execution unit architecture that enables multiple threads to issue SIMD instructions to an SIMD execution unit to process "vectors" of data points at the same time. In addition, it is also possible to employ multiple execution units in the same microprocessor to provide additional parallelization. The multiple execution units may be specialized to handle different types of instructions, or may be similarly configured to process the same types of instructions.

Irrespective of the number of distinct hardware threads, or execution paths, supported in a processor architecture, the operating system and other software that executes on a microprocessor will often need to execute a number of distinct and parallel instruction streams that exceeds the number of available execution paths on the microprocessor. These instruction streams, which may take the form of software threads, tasks, or processes, among other constructs, will hereinafter be referred to as "processes," although the invention is not limited to any particular terminology or nomenclature.

Whenever the number of processes requiring execution by a microprocessor exceeds the number of available execution paths, multiple processes are allocated to and executed on each individual execution path, typically by allocating time slices on each execution path to different processes. While the processes assigned to a given execution path technically are not executed in parallel, by enabling each process to execute for a period of time and switching between each process, each process is able to progress in a reasonable and fair manner and thus maintain the appearance of parallelism.

The introduction of time-based multithreading of this nature, however, creates some inefficiencies as a result of switching between executing different processes in a given execution path. In particular, whenever an operating system scheduling algorithm determines that a currently running process needs to give up utilization of a hardware thread and grant it to another process, the scheduler causes a timer interrupt, which triggers an interrupt handler to perform a context switch. A context switch typically consists of saving or otherwise preserving the context, or working state, of the process that was previously being executed, and is now being switched out, and restoring the context, or working state, of the process about to be executed, or switched in.

The working state of a process typically includes various state information that characterizes, from the point of view of a process, the state of the system at a particular point in time, and may include various information such as the contents of the register file(s), the program counter and other special purpose registers, among others. Thus, by saving the working state when a process is switched out, or suspended, and then restoring the working state when a process is switched in, or resumed, the process functionally executes in the same manner as if the process was never interrupted.

One undesirable side effect of performing a context switch, however, is the latency that is associated with saving one context and loading another context. Loading a new context can consume hundreds of execution cycles due to the large numbers of registers present in modern processor architectures. In addition, since the memory cache is usually filled with data from the formerly running process at the time of the context switch, the context for a process that was saved the last time that process was executed may no longer be cached, so attempting to load a new context often results in a cache miss and the additional delay associated with loading the context from a lower level of memory.

Attempts have been made to reduce the adverse impacts of context switches, typically by attempting to prefetch instructions and/or data that might be used by a process once it resumes execution. However, saving and restoring the context itself can still add significant latency to a context switch.

Therefore, a significant need continues to exist in the art for a manner of minimizing the adverse performance impact associated with context switching.

SUMMARY OF THE INVENTION

The invention addresses these and other problems associated with the prior art by providing a circuit arrangement and method that utilize thread pair context caching, where a pair of hardware threads in a multithreaded processor, which are each capable of executing a process, are effectively paired together, at least temporarily, to perform context switching operations such as context save and/or load operations in advance of context switches performed in one or more of such paired hardware threads. By doing so, the overall latency of a context switch, where both the context for a process being switched from must be saved, and the context for the process being switched to must be loaded, may be reduced.

Consistent with one aspect of the invention, for example, a multithreaded processor includes a plurality of hardware threads, where the plurality of hardware threads includes first and second hardware threads, and where each of the first and second hardware threads is capable of executing a process among a plurality of processes. The circuit arrangement also includes control logic disposed in the multithreaded processor and configured to, during execution of a first process among the plurality of processes in the first hardware thread, perform in the second hardware thread at least one context switching operation in advance of a context switch to a second process among the plurality of processes.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
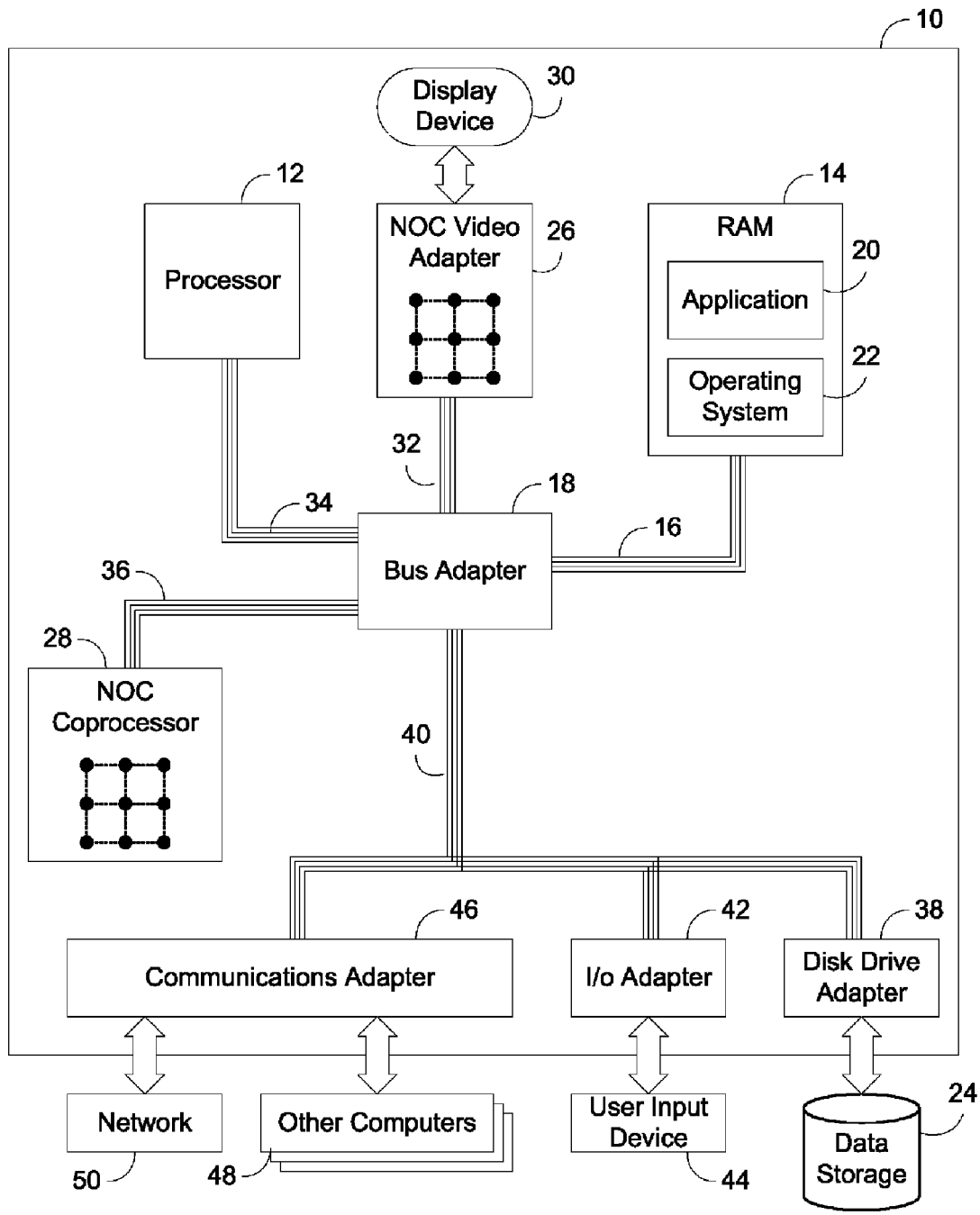
FIG. 1 is a block diagram of exemplary automated computing machinery including an exemplary computer useful in data processing consistent with embodiments of the present invention.

Embodiments consistent with the invention utilize thread pair context caching to reduce context switching latency in a multithreaded processor. With thread pair context caching, a hardware thread is effectively paired with another hardware thread to assist in performing context switching operations to reduce the latency of context switches for processes executing on one or both of the hardware threads. As will become more apparent below, the context switch operations may include operations such as saving or loading context data. In addition, the context data that may be saved or loaded may include, for example, the contents of general purpose registers, special purpose registers, program counters, and any other data associated with an architected state for a processor.

In some embodiments, thread pair context caching consistent with the invention may utilize two threads that are paired with one another to form a thread pair that collectively execute a plurality of time-multiplexed processes. In such embodiments, the pair of hardware threads alternate between executing processes such that, while one thread is executing a process, and serving as a primary thread, the other thread is serving as a background thread, performing context switch operations in preparation for performing a context switch to another process. When the context switch occurs, the two threads effectively swap roles, and the thread that performed the context switch operations in its role as a background thread begins to execute the next process in its new role as a primary thread, while the thread that executed the prior process in its role as a primary thread begins to perform context switch operations in preparation for the next context switch in its new role as a background thread. The threads may therefore swap roles at each context switch.

In some embodiments, threads may be paired together only temporarily, while in other embodiments, threads may be permanently paired. In addition, thread pairing may only be utilized in some embodiments whenever a thread is disabled or otherwise inactive, and not required to perform other work for the processor, since a thread that is performing context switch operations is typically unavailable for handling other work for a processor. In addition, the threads that perform context switch operations are otherwise capable of executing processes, and are typically not specifically configured to only perform context switch operations. It will also be appreciated that a thread pair may be created any time one thread is performing context switch operations in conjunction with another thread executing a process, so thread pair context caching need not be implemented using only two threads. For example, one thread could serve as a background thread for multiple primary threads in some embodiments, whereby that thread would effectively form thread pairs with each of the primary threads for which it serves as a background thread.

Other modifications will be apparent from the discussion hereinafter.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
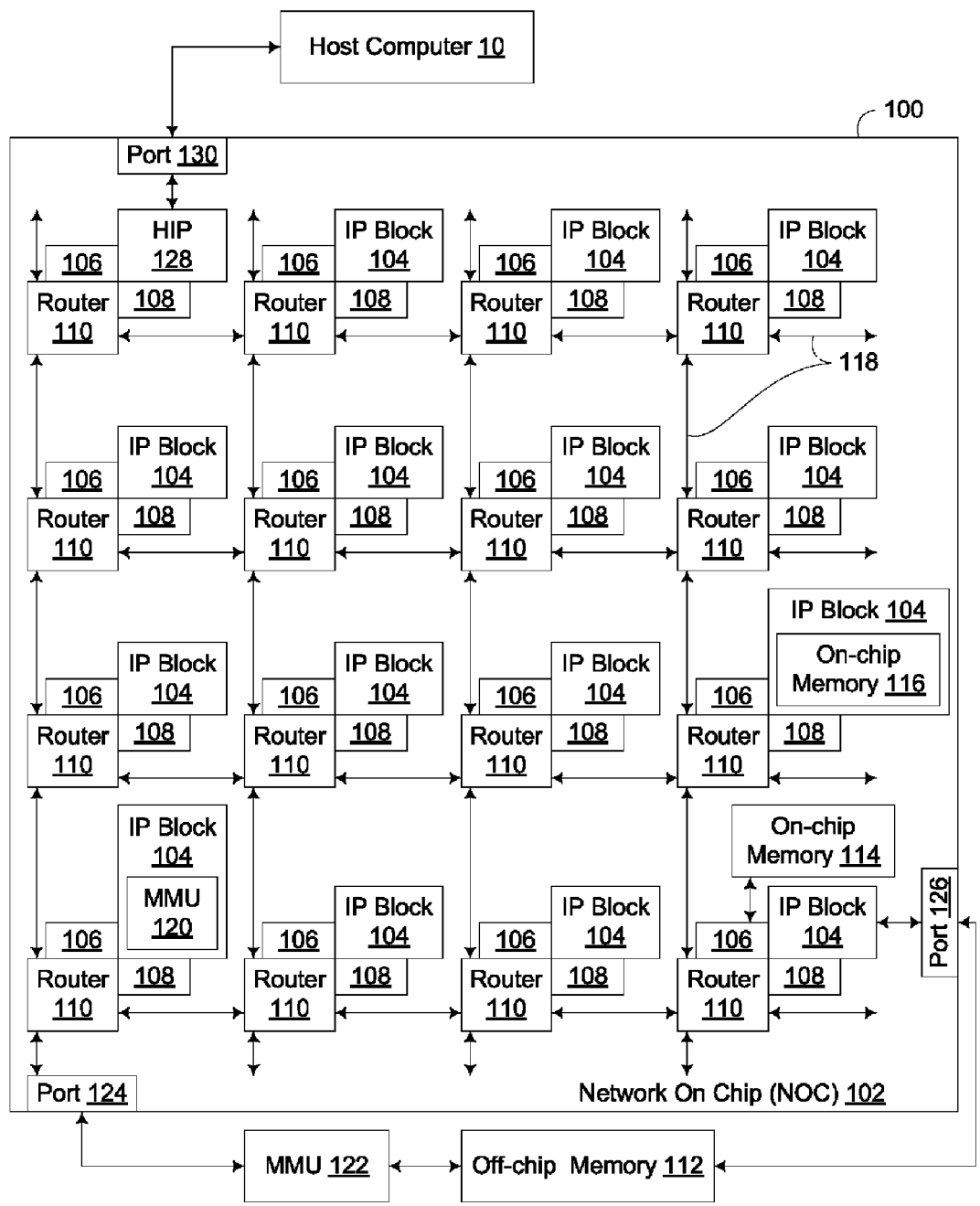
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
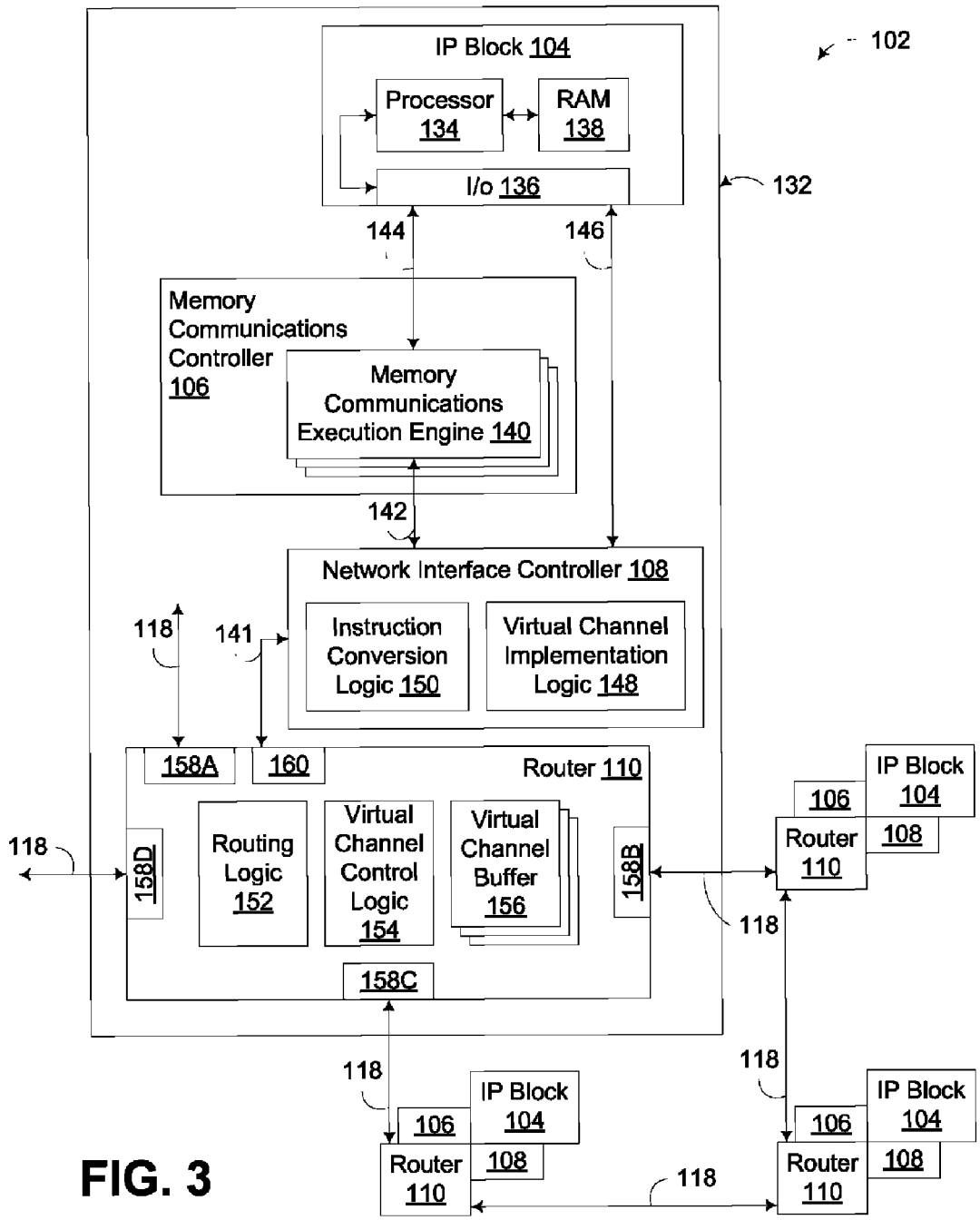
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
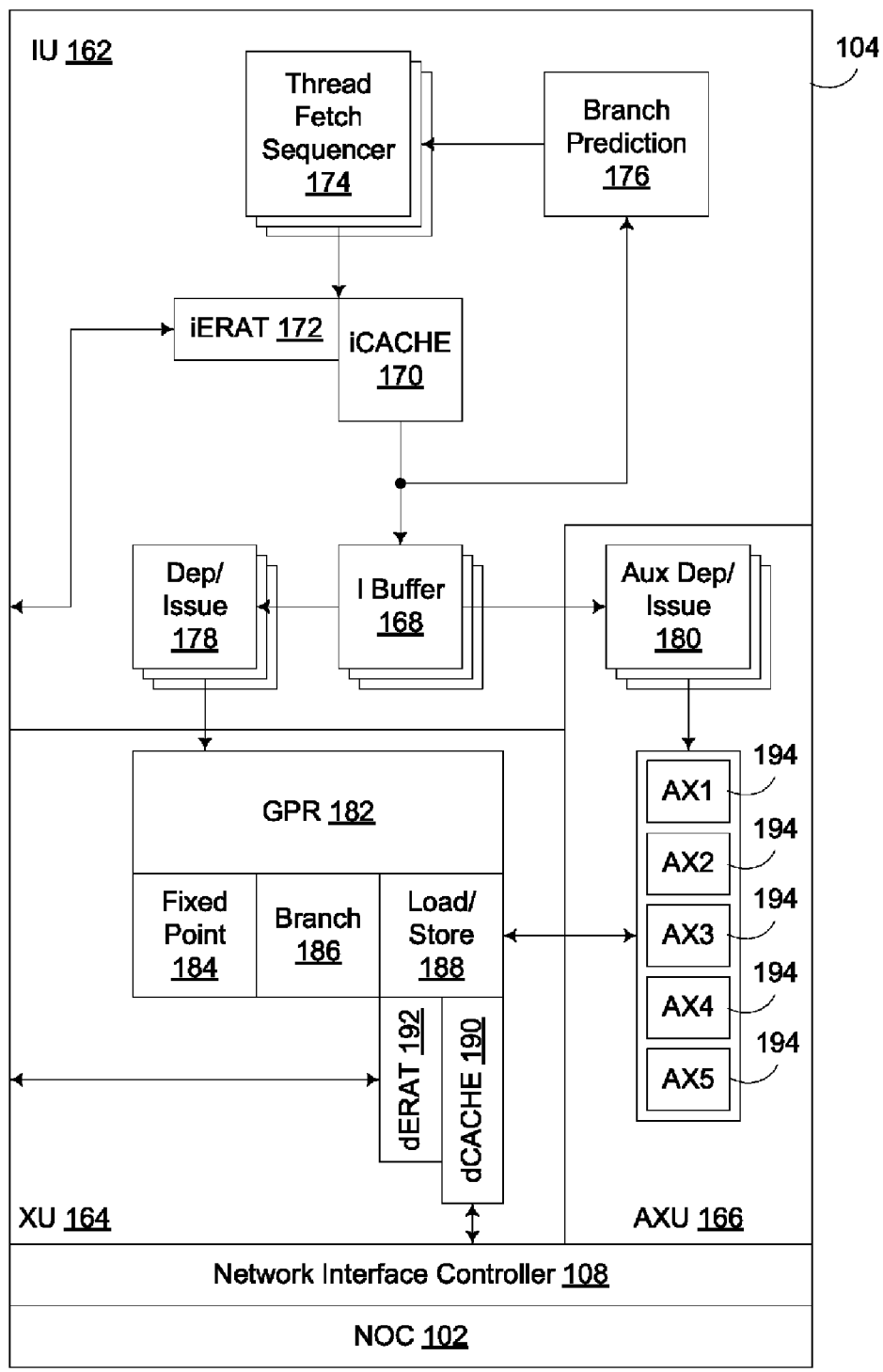
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Thread Pair Context Caching

Figure 5:
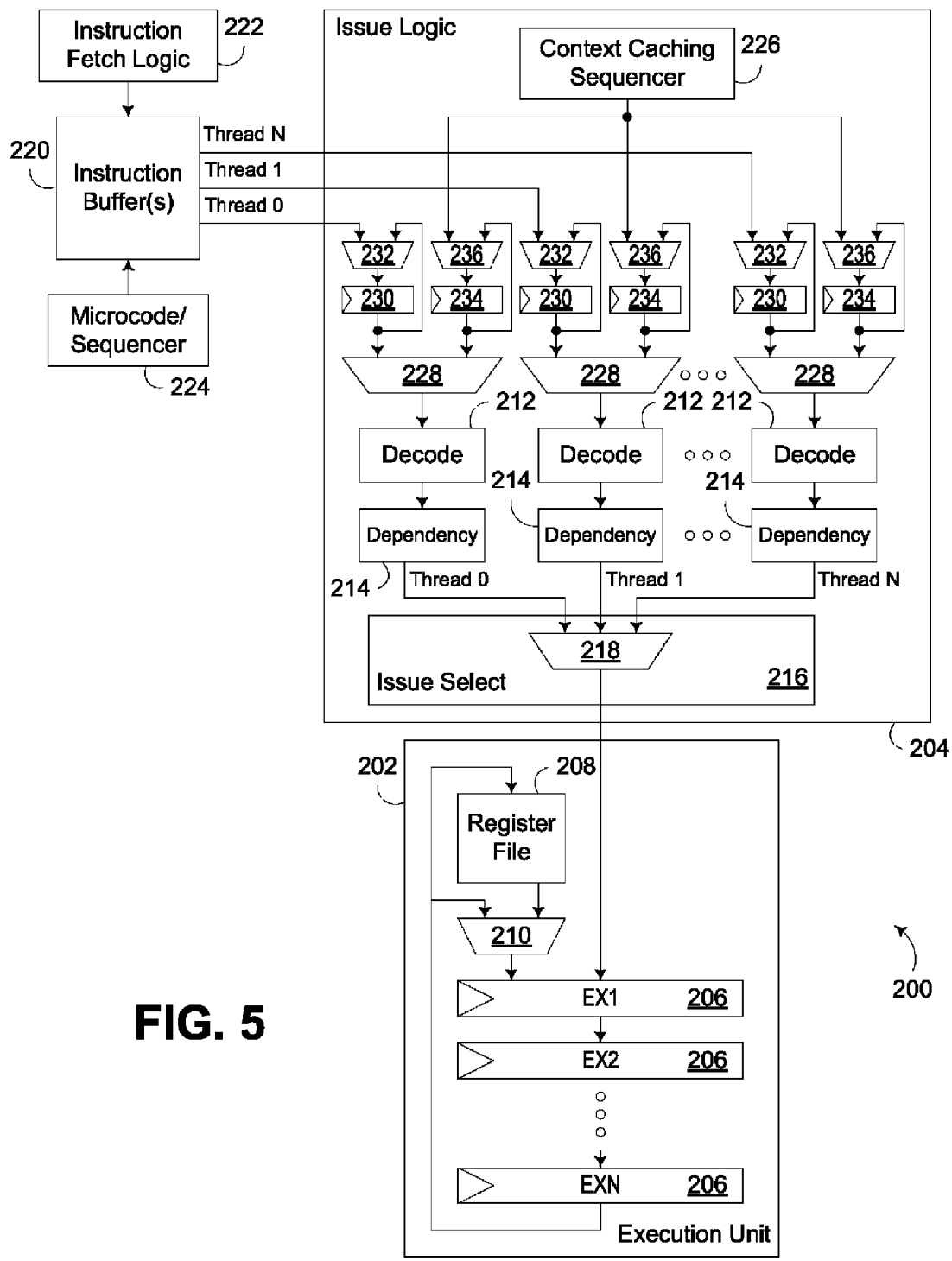
FIG. 5 is a block diagram of a processing unit incorporating thread pair context caching consistent with the invention, and capable of being implemented within an IP block from the NOC of FIG. 2.

Turning now to FIG. 5, this figure illustrates an exemplary processing unit 200 incorporating thread pair context caching consistent with the invention. Processing unit 200 may be implemented, for example, in an IP block such as an IP block 104 from FIGS. 1-4. In the alternative, processing unit 200 may be implemented in other processor architectures that issue and execute instructions, including single or multi-core microprocessors or microcontrollers.

Processing unit 200 includes an execution unit 202 that executes instructions issued thereto by issue logic 204, and includes a multi-stage execution pipeline with a plurality of execution stages 206 (separately denoted as execution stages EX1-EXN), which are capable of processing data stored in a register file 208 based upon the instructions issued by issue logic 204, and storing target data back to register file 208. Bypass logic 210 may also be provided intermediate to register file 208 and the execution pipeline to enable target data generated for one instruction that is to be used as an operand for a subsequent instruction to bypass the register file.

Execution unit 202 may be implemented as any of a number of different types of execution units, e.g., floating point units, fixed point units, or specialized execution units such as graphics processing units, encryption/decryption units, coprocessors, XML processing units, etc., and execution unit 202 may be configured as a scalar or vector (SIMD) execution unit. In addition, more than one execution unit may be used in processing unit 200 consistent with the invention. In one implementation, for example, execution unit 202 may be a vector floating point execution unit, and register file 208 may be a vector register file storing vectors of floating point values in a set of vector registers.

Issue logic 204 is multi-threaded, supporting a plurality of hardware threads, identified in FIG. 5 as threads 0-N. Furthermore, when multiple execution units are supported, issue logic 204 may be capable of independently issuing instructions to each execution unit. Each hardware thread is allocated a separate issue pipeline, with each issue pipeline including decode logic 212, which decodes each received instruction associated with a particular hardware thread. Dependency conditions (i.e., conditions where a newer instruction must be stalled until the result from an older, executing instruction is ready) are detected in dependency logic 214. The instructions, once any dependencies are resolved, are selected for issue, and issued, by issue select logic 216, which selection is represented in FIG. 5 by multiplexer 218. Instructions are issued to the first stage (EX1) of the execution stage pipeline for execution unit 202.

Instruction buffer logic 220, including one or more instruction buffers, supplies instructions from one or more instruction streams to each of the hardware threads managed by issue logic 204. Instruction buffer logic 220 is predominately fed with instructions fetched by instruction fetch logic 222, which manages the fetching of instructions into an instruction cache (not shown) from lower levels of memory to ensure that instructions will be available in the instruction cache when they are ready to be executed. In addition, instruction buffer logic 220 may also be fed with instructions by an optional microcode unit or sequencer 224, which is upstream from the instruction buffer logic, and which is capable of issuing a sequence of instructions to an instruction buffer in instruction buffer logic 220 in response to a command.

Instruction buffer logic 220, as noted above, issues instructions from one or more instruction streams to each hardware thread 0-N. These instruction streams, which are referred to herein as processes, may alternately be considered to represent other constructs that require a dedicated "state" for the processing unit, e.g., software threads or tasks. A context, in this regard, represents a snapshot of the architected state of the processing unit at a particular point in time, which is desirably saved whenever execution of an instruction stream is interrupted, and which when loaded back into the processing unit prior to execution of the instruction stream being resumed, enables the instruction stream to continue along as if no interruption had ever occurred.

To implement thread pair context caching consistent with the invention, a context caching sequencer 226 is coupled intermediate instruction buffer logic 220 and the issue pipelines for any hardware threads for which thread pair context caching is supported (i.e., sequencer 226 need not be coupled to all issue pipelines). In the embodiment of FIG. 5, every hardware thread supports thread pair context caching, and as such, sequencer 226 is coupled to each issue pipeline.

A thread pair, in this context, refers to any pairing of two hardware threads in which one hardware thread in the thread pair is used to perform context switch operations in parallel with the other hardware thread in the thread pair executing a particular instruction stream or process. These context switch operations, which are typically context save operations that save the context for a process that has been interrupted by a past context switch, and context load operations that load the context for a process that is about to be resumed by a future context switch, are typically implemented using move, copy, read/load or write/store instructions issued by sequencer 226.

Context caching sequencer 226 in the illustrated embodiment is coupled to blocking logic including a plurality of hardware thread-specific multiplexers 228, stage latches 230 and feedback multiplexers 232. In the illustrated embodiment, each multiplexer 228 is allocated to a particular hardware thread and is disposed intermediate the thread-specific output of instruction buffer logic 220 and the issue pipeline for that particular thread, with a first input thereof configured to receive instructions from the thread-specific output of instruction buffer logic 220 via an associated feedback multiplexer 232 and stage latch 230. Normally, each multiplexer 228, 232 passes the instructions output by instruction buffer logic 220 for the associated hardware thread to the associated issue pipeline.

Each multiplexer 228 also includes a second input that is coupled to an instruction output of sequencer 226 via a complementary stage latch 234 and feedback multiplexer 236. In addition, the selection of which input is passed to the output of each multiplexer 228 (e.g., via a select signal, not shown in FIG. 5) is also controlled by sequencer 226. In addition, each multiplexer 232 includes a feedback path from the output of the associated stage latch 230, with a select input of each multiplexer 232 controlled by sequencer 226 to selectively feed the current instruction stored in stage latch 230 back to the stage latch and thus effectively stall the instruction while the sequencer 226 outputs instructions to the second input of the associated multiplexer 228. Additional stall signals may also be output by sequencer 226 to other upstream stages, as well as to instruction buffer logic 220 to effectively block instructions from the associated thread.

Therefore, each multiplexer 228 is configured such that, when the second input is selected, instructions output by sequencer 226 are passed to the associated issue pipeline for the associated thread via stage latch 234 and feedback multiplexer 236. In addition, when the first input of a multiplexer 228 is deselected, the feedback input of the associated multiplexer 232 is selected and a stall signal is asserted to instruction buffer logic 232 and any other upstream stages, instructions for the associated thread that are awaiting issue in instruction buffer logic 220 are effectively blocked. Conversely, whenever instructions are fed from instruction buffer logic 220 to an issue pipeline for a hardware thread, instructions from sequencer 226 are effectively blocked via selection of a second input for the respective feedback multiplexer 236.

It will be appreciated that in some embodiments stage latches/feedback multiplexers 230, 232 and/or stage latches/feedback multiplexers 234, 236 may be omitted. For example, in some embodiments, there may be an architected state for which hardware threads are active, so if a thread is disabled from normal process execution, instruction buffer logic 220 would know not to send valid instructions for that thread. In other embodiments, a priority algorithm may be used to override normal execution on a particular hardware thread, and temporarily re-task the thread for context caching duty, whereby blocking logic such as stage latches/feedback multiplexers 230, 232 and/or stage latches/feedback multiplexers 234, 236 may be used. In other embodiments, sequencer 226 may be allocated a priority that is lower than that of the active hardware threads in the issue select algorithm implemented by issue select logic 218, so sequencer 226 may be configured to utilize blocking logic such as stage latches/feedback multiplexers 234, 236 to hold its own instructions as necessary.

In the illustrated embodiment, it is desirable for thread pair context caching to be used whenever a hardware thread is disabled and is thus otherwise unused (e.g., due to a lack of activity for the thread). Thus, sequencer 226 is configured to detect whenever one or more hardware threads are disabled, and pair any disabled hardware threads with other, active threads to form thread pairs. In the illustrated embodiment, a formerly disabled hardware thread is paired with an active thread to form a two thread pair, with one thread serving as a primary thread for the thread pair to execute processes, and the other thread serving as a background thread that is dedicated to performing context switching operations on behalf of the thread pair. The thread pair sequentially executes processes from among a plurality of processes using time-based multiplexing, with the roles of the threads being swapped as context switches are made from process to process. In other embodiments, thread pairs may include more than two threads, e.g., with one thread serving as a background thread for more than one primary thread, or with multiple threads serving as background threads for a primary thread. In addition, in some embodiments threads may be paired together even when there is enough work such that otherwise a background thread could be used to execute different processes (i.e., a thread need not be disabled in order to serve as a background thread for a thread pair). Given that the roles of primary and background threads in a thread pair desirably switch after each context switch, however, it is desirable for each thread in a thread pair to have the capability of executing processes. In addition, in some embodiments, associations between threads in a thread pair may be permanent, e.g., so that two threads always collectively operate to execute time-multiplexed processes, or may be temporary, e.g., on demand, or based on the availability of a disabled thread. Associations between threads may also be static, e.g., so that thread 1 will only pair with thread 0, or may be dynamic in nature, e.g., so thread 1 may pair with any of threads 0 and 2-N.

Figure 6:
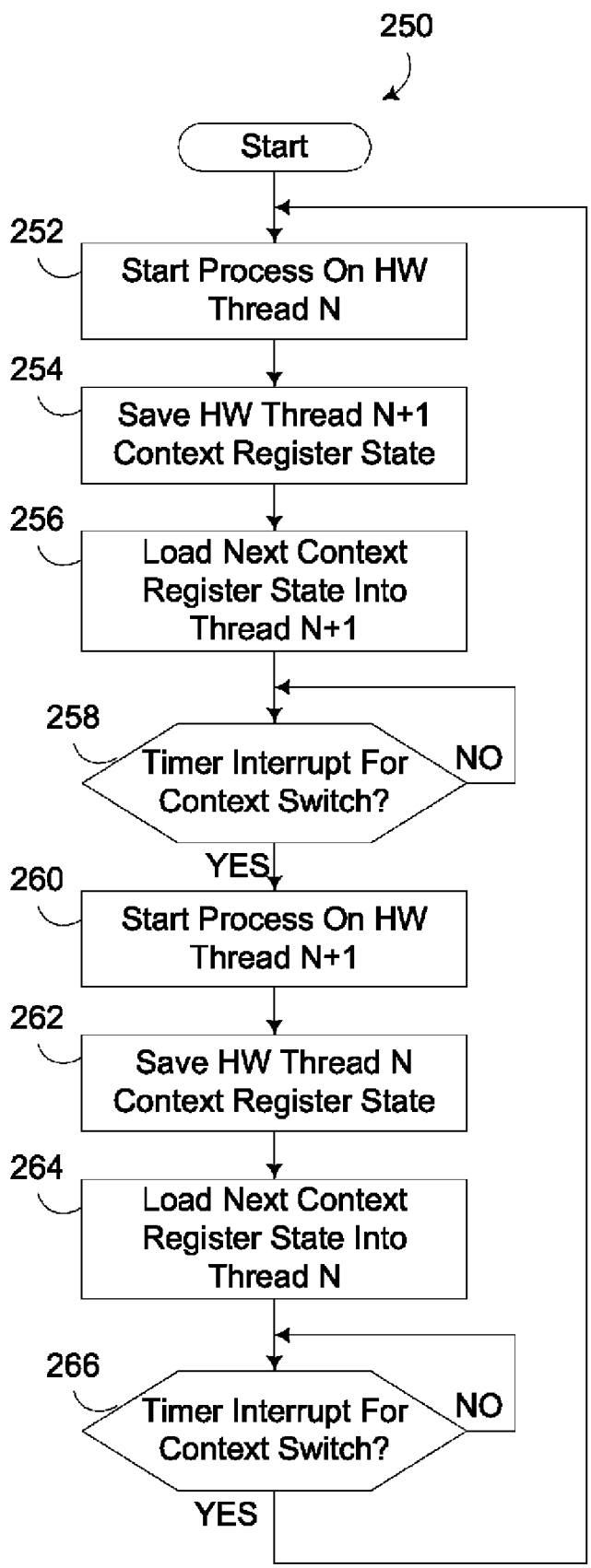
FIG. 6 is a flowchart illustrating the operation of the context caching sequencer logic referenced in FIG. 5.

FIG. 6 next illustrates at 250 a sequence of operations that may be performed by sequencer 226 to implement thread pair context caching consistent with the invention. In this example, context switches are performed in response to timer interrupts, e.g., so that context switches are time-based, rather than demand-based. In addition, fine grained hardware multithreading is used, whereby each hardware thread has its own architected state, e.g., including all general purpose registers (GPR's), all special purpose registers (SPR's), all vector registers (if separate from the GPR's), and any other state information representing the current state for the thread.

Threads N and N+1 are considered to form a thread pair, and at block 252, a process is started on hardware thread N, e.g., by performing a context switch to the process and executing instructions from the instruction stream for the process. Next, in block 254, while the process is executing on hardware thread N, the current context of hardware thread N+1 is saved, e.g. by outputting move instructions from sequencer 226 to the issue pipeline for thread N+1 to move the contents of the registers representing the architected state for thread N+1 to a dedicated region for the process that was previously executing in thread N+1 in the memory address space when the context switch occurred. Also, in block 256, the context for the next process to be executed is loaded into the architected state for thread N+1, e.g. by outputting move instructions from sequencer 226 to the issue pipeline for thread N+1 to move the context from a dedicated region for the next process in the memory address space into the registers representing the architected state for thread N+1.

Next, block 258 waits for a timer interrupt that signals a context switch, and once the timer interrupt occurs, control passes to block 260 to start the next process on hardware thread N+1, e.g., by performing a context switch to the next process and executing instructions from the instruction stream for the next process. It will be appreciated that, due to the preload of the context for the next process performed in block 256, so long as the preload is complete, the next process can begin executing on thread N+1 immediately after the context switch, thus eliminating the time that would otherwise be required to load the context after the context switch.

Thereafter, blocks 262 and 264 perform similar operations for thread N as were performed for thread N+1 by blocks 254 and 256. In particular, block 262 saves the current context of hardware thread N, and block 256 loads the context for the next process to be executed by thread N. Block 266 then waits for a timer interrupt that signals another context switch, and once the timer interrupt occurs, control returns to block 252 to start the next process on hardware thread N, and as a result of the preload of the context for the next process performed in block 264, the time that would otherwise be required to load the context after the context switch is reduced or eliminated. As a result, a sequence of processes is executed in a time-multiplexed fashion, with thread N operating as a primary thread and thread N+1 operating as a background thread in blocks 252-258, and with threads N and N+1 switching roles in blocks 260-266.

It will be appreciated that in some instances, the saving of a context and/or loading of a context that is performed by a hardware thread may not complete by the time the next context switch occurs and that thread switches its role to a primary thread. For example, loading of a context may result in a cache miss in certain instances, and thus retrieval of the context from a lower level of memory may delay the restoration of the context for the next process. Nonetheless, by initiating the save and/or load of a context prior to a context switch will in many instances at least reduce the latency associated with the context switch. As another example, the amount of data that needs to be transferred, or the time required to transfer that data may simply exceed the amount of time that a process will execute prior to a context switch.

In addition, the activities of other hardware threads may impact the amount of time it takes to save and load contexts. For example, issue select logic 218 (FIG. 5) may implement a high/low priority scheme that prioritizes high priority threads over low priority threads, and uses a counter to issue instructions from any low priority threads that have been awaiting issuance beyond a certain number of cycles. It may be desirable to set background threads to low priorities to minimize adverse effects on the performance of other, higher priority threads. In the alternative, background threads may be assigned different priorities (e.g., if more than two levels of priorities are supported) in other embodiments, and in some embodiments, no concept of priority may be supported.

It will also be appreciated that loading of a new context need not be delayed until the saving of an old context is complete, and as such, blocks 254 and 256, and blocks 262 and 264, may be performed concurrently in some implementations. Interleaving the operations may provide a benefit in that if the new context is not currently cached, issuing at least one load instruction prior to completing the save of the old context will initiate servicing of the cache miss earlier than would otherwise occur.

Figure 7:
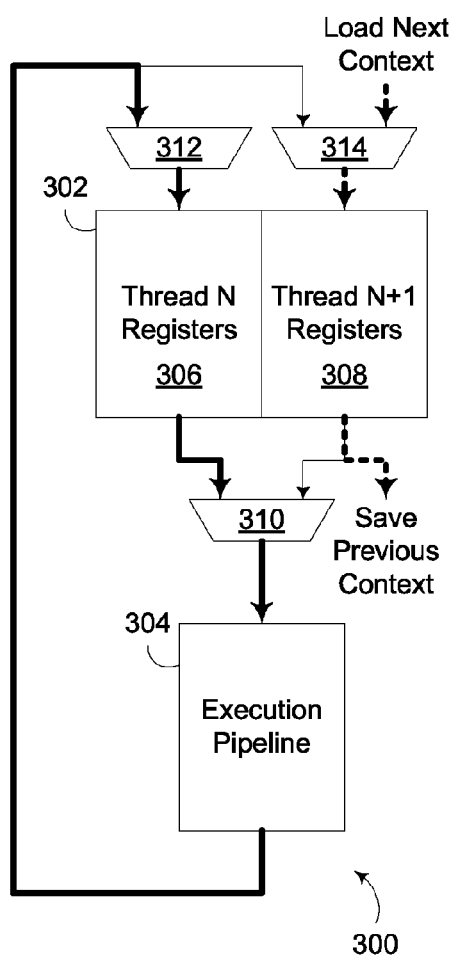
FIGS. 7 and 8 are block diagrams illustrating the data flow in a thread pair in a multithreaded processing unit, illustrating the loading and saving of context data by an inactive hardware thread in a manner consistent with the invention.
Figure 8:
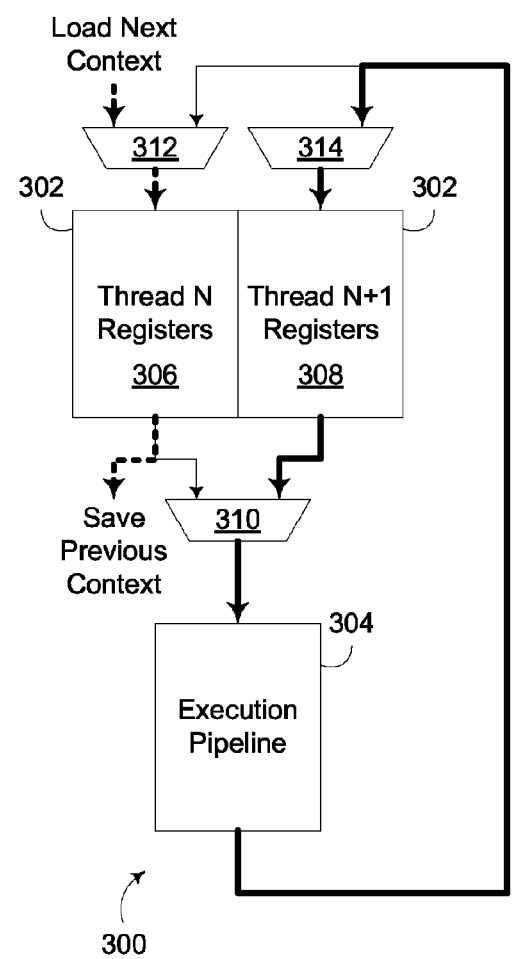

FIGS. 7 and 8 next illustrate the data flow in a thread pair in a multithreaded processing unit 300, e.g., as would occur during the sequence of operations illustrated in FIG. 6. FIG. 7, for example, illustrates a register file 302 and an execution pipeline 304, with the register file including first and second portions 306, 308 that are dedicated to the architected state for hardware threads N and N+1. The routing of operand data to execution pipeline 304 from register file 302 is represented by multiplexer 310, while the routing of result data back to the appropriate portion 302, 304 of the register file 302 is represented by multiplexers 312, 314.

When thread N is the primary thread for the thread pair, and thread N+1 is the background thread (e.g., during blocks 252-258 of FIG. 6), operand data for the process executing in thread N is routed from first portion 306 of register file 302 to execution pipeline 304 via multiplexer 310, while result data is written back into first portion 306 of register file 302 via multiplexer 312. In addition, concurrently with the execution of the process in thread N, the context for the process that was previously executing in thread N+1 is saved, by storing the contents of second portion 308 of register file 302 out to memory, and loading the context for the next process to execute in thread N+1 from memory into second portion 308 of register file 302.

Next, as shown in FIG. 8, when a context switch is performed and thread N+1 becomes the primary thread for the thread pair, and thread N becomes the background thread (e.g., during blocks 260-266 of FIG. 6), operand data for the process now executing in thread N+1 is routed from second portion 308 of register file 302 to execution pipeline 304 via multiplexer 310, while result data is written back into second portion 308 of register file 302 via multiplexer 314. In addition, concurrently with the execution of the process in thread N+1, the context for the process that was previously executing in thread N is saved, by storing the contents of first portion 306 of register file 302 out to memory, and loading the context for the next process to execute in thread N from memory into first portion 306 of register file 302.

Figure 9:
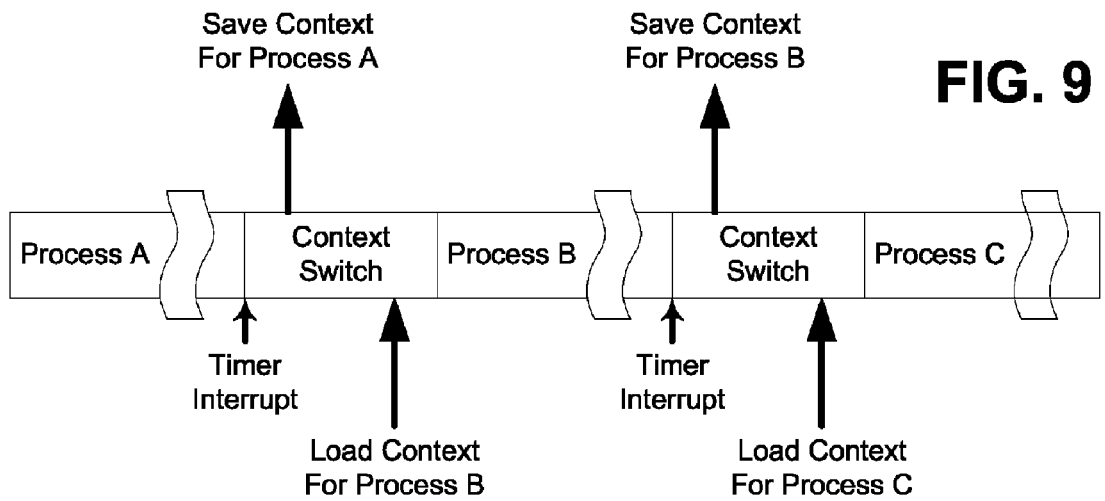
FIGS. 9 and 10 are timing diagrams illustrating the timing of context switch operations respectively without and with the use of thread pair context caching consistent with the invention.
Figure 10:
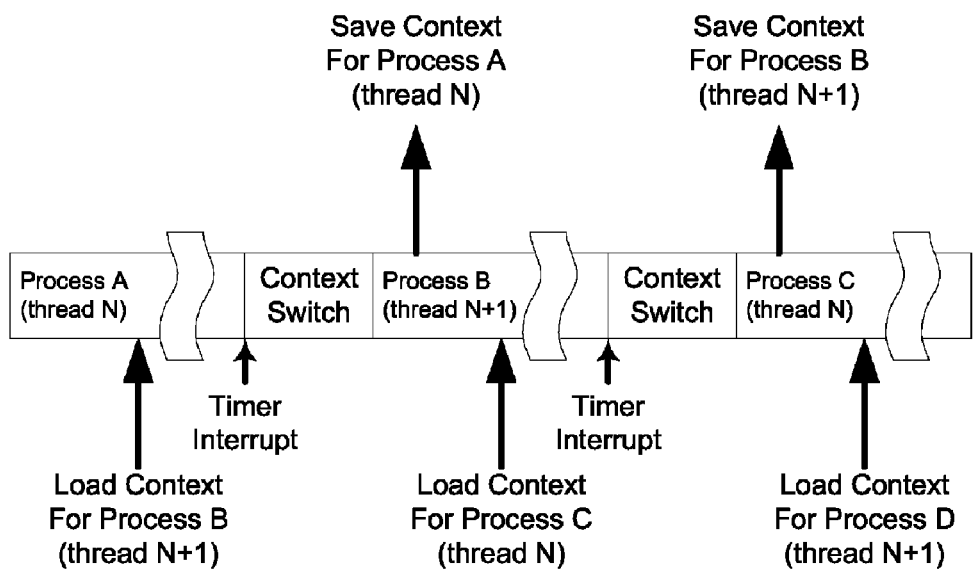

To further illustrate thread pair context caching consistent with the invention, FIGS. 9 and 10 are timing diagrams diagrammatically illustrating the timing of context switch operations respectively without and with the use of thread pair context caching consistent with the invention. FIG. 9, in particular, assumes that a plurality of processes A, B, C, D, ... are executed in a time-multiplexed fashion on a single hardware thread. It may be seen that process A executes first, and upon the occurrence of a timer interrupt, a context switch is initiated to process B. After the context switch is initiated, the context for process A is saved, followed by loading the context for process B. Once the context switch is complete, process B then begins executing in the thread. Upon the next context switch, to process C, a similar sequence of operations occur, whereby the context for process B is saved, and the new context for process C is loaded, prior to beginning execution of process C.

In contrast, as shown in FIG. 10, with thread pair context caching, process A executes first on thread N, while concurrently the context for the next process (process B) is loaded by thread N+1 (the save of the context for a prior process executing on thread N+1 is omitted from FIG. 10). Once the context switch occurs as a result of a timer interrupt, the latency of the context switch is reduced based upon the fact that the preload of the context for process B has already been started during the execution of process A on thread N. In some instances, in fact, the context switch may enable process B to begin executing on thread N+1 almost immediately (or after any other context switch operations that are required to be performed) if the preload of the context completes prior to the timer interrupt (note that the length of the context switch block in FIG. 10 is shorter relative to that of FIG. 9 to indicate the reduced latency for the context switch, but no specific times should be implied by the relative lengths of the blocks).

Once the context switch is complete, process B begins to execute on thread N+1, while concurrently the context for the previous process (process A) is saved and the context for the next process (process C) is loaded by thread N. Once the next context switch occurs as a result of a timer interrupt, the latency of that context switch is once again reduced based upon the fact that the preload of the context for process C has already been started (and possibly completed during the execution of process B on thread N+1. Thereafter, process C is started on thread N, while concurrently the context for the previous process (process B) is saved and the context for the next process (process D) is loaded by thread N+1.

As such, it may be seen that the latency of context switches can be reduced through the use of thread pair context caching, such that an otherwise disabled hardware thread can serve to accelerate the performance of another thread with which it is paired in time-multiplexing a plurality of processes using fine grained multithreading.

Various modifications may be made without departing from the spirit and scope of the invention. Therefore, the invention lies in the claims hereinafter appended.

What is claimed is:

1. A method of executing processes in a multithreaded processor of the type including a plurality of hardware threads, wherein the plurality of hardware threads includes first and second hardware threads from among the plurality of hardware threads, the method comprising:
concurrently executing processes from among a plurality of processes using the first and second hardware threads;
after concurrently executing the plurality of processes using the first and second hardware threads, determining that the second hardware thread is disabled;
in response to determining that the second hardware thread is disabled, forming a thread pair between the first and second hardware threads such that the first and second hardware threads collectively execute processes from among the plurality of processes using time-based multiplexing to alternate between executing processes on the first hardware thread and executing processes on the second hardware thread, wherein the first and second hardware threads collectively execute a single process from among the plurality of processes at a time while the thread pair is formed, and wherein forming the thread pair includes:
performing a first context switch to initiate execution of a first process among the plurality of processes on the first hardware thread of the thread pair;
during execution of the first process on the first hardware thread of the thread pair, loading at least a portion of a context for a second process among the plurality of processes with the second hardware thread of the thread pair;
thereafter performing a second context switch to initiate execution of the second process on the second hardware thread of the thread pair, wherein at least a portion of the context for the second process is loaded prior to performing the second context switch;
during execution of the second process on the second hardware thread of the thread pair, saving at least a portion of a context for the first process and loading at least a portion of a context for a third process among the plurality of processes with the first hardware thread of the thread pair;
thereafter performing a third context switch to initiate execution of the third process on the first hardware thread of the thread pair, wherein at least a portion of the context for the third process is loaded prior to performing the third context switch; and
during execution of the third process on the first hardware thread of the thread pair, saving at least a portion of a context for the second process with the second hardware thread of the thread pair.

2. The method of claim 1, wherein the multithreaded processor includes a register file including a first portion allocated to the first hardware thread of the thread pair and a second portion allocated to the second hardware thread of the thread pair, wherein loading the portion of the context for the second process includes moving context data from memory to the second portion of the register file, wherein saving the portion of the context for the first process includes moving context data from the first portion of the register file to memory, wherein loading the portion of the context for the third process includes moving context data from memory to the first portion of the register file, and wherein saving the portion of the context for the second process includes moving context data from the second portion of the register file to memory.

3. A circuit arrangement implemented in at least one integrated circuit device, comprising:
  a multithreaded processor including a plurality of hardware threads, the plurality of hardware threads including first and second hardware threads, each of the first and second hardware threads capable of executing a process among a plurality of processes; and
  control logic disposed in the multithreaded processor and configured to determine that the second hardware thread is disabled, and in response to determining that the second hardware thread is disabled, form a thread pair between the first and second hardware threads such that the first and second hardware threads collectively execute the plurality of processes using time-based multiplexing to alternate between executing processes on the first hardware thread and executing processes on the second hardware thread, wherein the control logic is configured to, during execution of a first process among the plurality of processes in the first hardware thread while the thread pair is formed between the first and second hardware threads, perform in the second hardware thread at least one context switching operation in advance of a context switch to a second process among the plurality of processes, wherein the first and second hardware threads collectively execute a single process from among the plurality of processes at a time while the thread pair is formed, and wherein the control logic is configured to enable the first and second hardware threads to concurrently execute processes from among the plurality of processes when the second hardware thread is determined to not be disabled.

4. The circuit arrangement of claim 3, wherein the at least one context switching operation includes a context preload operation that preloads context data for the second process.

5. The circuit arrangement of claim 4, further comprising a register file, the register file including a first plurality of registers assigned to the first hardware thread and a second plurality of registers assigned to the second hardware thread, wherein the context preload operation preloads saved context data for the second process into the second plurality of registers.

6. The circuit arrangement of claim 4, wherein the control logic is further configured to perform a context switch to the second process after preloading the context data for the second process by starting execution of the second process on the second hardware thread.

7. The circuit arrangement of claim 6, wherein the control logic is further configured to, during execution of the second process in the second hardware thread after performing the context switch to the second process, perform in the first hardware thread at least one context switching operation in advance of a context switch to a third process.

8. The circuit arrangement of claim 7, wherein the at least one context switching operation performed in the first hardware thread includes a context save operation that saves context data for the first process.

9. The circuit arrangement of claim 8, further comprising a register file, the register file including a first plurality of registers assigned to the first hardware thread and a second plurality of registers assigned to the second hardware thread, wherein the context preload operation saves as context data for the first process contents of the first plurality of registers.

10. The circuit arrangement of claim 8, wherein the control logic is further configured to perform a context switch to the third process after saving the context data for the first process by starting execution of the third process on the first hardware thread.

11. The circuit arrangement of claim 3, wherein the multithreaded processor includes instruction buffer logic configured to output instructions associated with the plurality of processes to the plurality of hardware threads, wherein each of the first and second hardware threads includes a dedicated issue pipeline coupled to the instruction buffer logic and respectively configured to issue instructions associated with the first and second hardware threads, and wherein the control logic includes:
  sequencer logic coupled to the first and second issue pipelines and configured to perform the context switching operations by outputting context switching instructions to the first and second issue pipelines; and
  blocking logic coupled to the first and second issue pipelines and configured to selectively block instructions from being issued by the instruction buffer logic to the first issue pipeline while the sequencer logic is outputting context switching instructions to the first issue pipeline, and to selectively block instructions from being issued by the instruction buffer logic to the second issue pipeline while the sequencer logic is outputting context switching instructions to the second issue pipeline.

12. An integrated circuit device including the circuit arrangement of claim 3.

13. A program product comprising a recordable computer readable medium and logic definition program code resident on the computer readable medium and defining the circuit arrangement of claim 3.

14. A method of executing processes in a multithreaded processor of the type including a plurality of hardware threads, wherein the plurality of hardware threads includes first and second hardware threads, the method comprising:
  concurrently executing processes from among a plurality of processes using the first and second hardware threads;
  after concurrently executing the plurality of processes using the first and second hardware threads, determining that the second hardware thread is disabled;
  in response to determining that the second hardware thread is disabled, forming a thread pair between the first and second hardware threads such that the first and second hardware threads collectively execute processes from among the plurality of processes using time-based multiplexing to alternate between executing processes on the first hardware thread and executing processes on the second hardware thread, wherein the first and second hardware threads collectively execute a single process from among the plurality of processes at a time while the thread pair is formed, and wherein forming the thread pair includes:
    executing a first process among the plurality of processes in the first hardware thread;
    thereafter performing a context switch to a second process among the plurality of processes and executing the second process in the second hardware thread; and
    performing at least one context switching operation in the second hardware thread during execution of the first process in the first hardware thread and in advance of the context switch to the second process.

15. The method of claim 14, wherein the at least one context switching operation includes a context preload operation that preloads context data for the second process.

16. The method of claim 15, wherein the multithreaded processor includes a register file, the register file including a first plurality of registers assigned to the first hardware thread and a second plurality of registers assigned to the second hardware thread, wherein the context preload operation preloads saved context data for the second process into the second plurality of registers.

17. The method of claim 15, further comprising performing at least one context switching operation in the first hardware thread during execution of the second process in the second hardware thread, after performing the context switch to the second process, and in advance of a context switch to a third process.

18. The method of claim 17, wherein the at least one context switching operation performed in the first hardware thread includes a context save operation that saves context data for the first process.

19. The method of claim 18, wherein the multithreaded processor includes a register file, the register file including a first plurality of registers assigned to the first hardware thread and a second plurality of registers assigned to the second hardware thread, wherein the context preload operation saves as context data for the first process contents of the first plurality of registers.

20. The method of claim 18, further comprising performing a context switch to the third process after saving the context data for the first process by starting execution of the third process on the first hardware thread.

21. The method of claim 14, wherein the multithreaded processor includes instruction buffer logic configured to output instructions associated with the plurality of processes to the plurality of hardware threads, wherein each of the first and second hardware threads includes a dedicated issue pipeline coupled to the instruction buffer logic and respectively configured to issue instructions associated with the first and second hardware threads, and wherein performing the at least one context switching operation includes:
    outputting context switching instructions to the second issue pipeline using sequencer logic coupled to the first and second issue pipelines; and
    selectively blocking instructions from being issued by the instruction buffer logic to the second issue pipeline while the sequencer logic is outputting context switching instructions to the second issue pipeline using blocking logic coupled to the first and second issue pipelines, wherein the blocking logic is further configured to selectively block instructions from being issued by the instruction buffer logic to the first issue pipeline while the sequencer logic is outputting context switching instructions to the first issue pipeline.

* * * * *